ns*

(12) United States Patent
Parent

(10) Patent No.: US 6,857,525 B2
(45) Date of Patent: Feb. 22, 2005

(54) FILTRATION CARTRIDGES WITH METALLIC END MEMBERS AND METHOD OF MANUFACTURING

(75) Inventor: Luc Parent, Saguenay (CA)

(73) Assignee: B.D.H. Industries, Inc., Saguenay (CA)

( * ) Notice: Subject to any disclaimer, the term of this patent is extended or adjusted under 35 U.S.C. 154(b) by 136 days.

(21) Appl. No.: 10/389,841

(22) Filed: Mar. 17, 2003

(65) Prior Publication Data

US 2003/0230528 A1 Dec. 18, 2003

Related U.S. Application Data

(60) Provisional application No. 60/389,459, filed on Jun. 18, 2002.

(51) Int. Cl.$^7$ .............................................. B01D 27/06
(52) U.S. Cl. .................... 210/457; 210/489; 210/493.2; 55/510; 55/521; 164/98
(58) Field of Search ................................ 210/457, 483, 210/487–489, 497.01, 497.1, 493.1, 493.2; 55/498, 510, 521, DIG. 5; 164/98

(56) References Cited

U.S. PATENT DOCUMENTS

| | | | |
|---|---|---|---|
| 2,957,235 A | 10/1960 | Steinberg | |
| 3,308,958 A | 3/1967 | Berger et al. | |
| 3,426,910 A | * 2/1969 | Winzen | 210/493.1 |
| 3,501,013 A | 3/1970 | Madsen | |
| 3,857,688 A | 12/1974 | Wisnewski | |
| 4,878,930 A | 11/1989 | Manniso et al. | |
| 5,062,910 A | 11/1991 | Garcera et al. | |
| 5,149,360 A | 9/1992 | Koehlet et al. | |
| 5,250,094 A | 10/1993 | Chung et al. | |
| 5,472,537 A | 12/1995 | Friel et al. | |
| 5,545,323 A | 8/1996 | Koehler et al. | |
| 5,580,456 A | 12/1996 | Bowlsbey | |
| 5,733,452 A | 3/1998 | Whitlock | |
| 6,096,212 A | 8/2000 | Quick et al. | |
| 6,099,729 A | 8/2000 | Cella et al. | |
| 6,180,909 B1 | 1/2001 | Quick et al. | |
| 6,186,341 B1 | 2/2001 | Konstantin et al. | |
| 6,329,625 B1 | 12/2001 | Quick et al. | |
| 6,514,408 B1 | * 2/2003 | Simone | 210/323.2 |
| 2002/0011440 A1 | 1/2002 | Quick et al. | |

FOREIGN PATENT DOCUMENTS

| | | |
|---|---|---|
| EP | 0 520 737 A1 | 12/1992 |
| EP | 0722761 | 7/1996 |

* cited by examiner

*Primary Examiner*—Matthew O. Savage
(74) *Attorney, Agent, or Firm*—Seyfarth Shaw LLP

(57) ABSTRACT

The filtration cartridge comprises a filtration element and a heat-resistant extension band having a first and a second longitudinal edge. The first edge of the extension band is attached along an edge of the filtration element. In a first embodiment, a metallic cast end member is formed by immersing the second edge of the extension band into molten metal. The molten metal is then allowed to solidify with the second edge of the extension band embedded therein. In a second embodiment, the extension band is squeezed on a porous inner core and an end plate is welded on the end of the inner core. Providing filtration cartridges with a metallic end member allows increasing their resistance to mechanical shocks and increasing their maximum operating temperatures.

25 Claims, 2 Drawing Sheets

FILTRATION CARTRIDGES WITH METALLIC END MEMBERS AND METHOD OF MANUFACTURING

RELATED APPLICATION

The present application claims the benefits of U.S. provisional patent application No. 60/389,459 filed Jun. 18, 2002, which is hereby incorporated by reference.

BACKGROUND

Filtration cartridges are well known as cleaning media for fluids (liquids or gases) in a wide range of applications. For instance, in the case of gases, filtration cartridges advantageously replace bags made of porous paper or fabric to remove particles therefrom.

In industrial plants, the treatment of process fumes was traditionally done by a dust collector that can contain hundreds or even thousands of bags. These bags must be periodically replaced by new ones as they become saturated or "blinded", as referred to in the art. Nowadays, bags are progressively replaced by filtration cartridges, in particular cylindrical filtration cartridges provided with a pleated filtration element supported by or between a pair of end members which ensure proper sealing of the cartridges in their receptacles. One important advantage of these cartridges over bags is that the surface area of the filtration element is about 3–4 times that of bags. This allows dust collectors with these filtration cartridges to treat an increased volume of gases. Dust collectors may then be smaller or used for longer periods of time before maintenance or replacement. This last advantage is important in terms of productivity since it decreases the frequency of equipment shutdown for carrying out the maintenance of a dust collector.

The selection or the design of a filtration cartridge must take into account the maximum temperature at which it will operate. Generally, conventional filtration cartridges are only suitable for gases having a relatively low temperature. Cartridges for gases having a relatively high temperature are significantly more costly but are nevertheless limited in terms of the maximum gas temperature that they can handle. Presently, commercially-available filtration cartridges are typically used with gases up to about 200° C. Higher temperatures would result in degradation thereof. This limit is problematic since many industrial plants generate fumes at higher temperatures. Gases must then be cooled before entering the dust collector. Cooling is widely carried out by diluting the hot gases with ambient air. Unfortunately, this increases the volume of gases to be filtered and consequently, it increases the number of required cartridges and thus the size of the dust collector.

The degradation of conventional filtration cartridges generally observed near 200° C. comes for the most part from the materials used for making the end members. These end members are usually made of a polymeric material which could be damaged if heated to more than about 200° C. During manufacturing of such conventional filtration cartridges, one end of the filtration element is immersed into a liquid polymeric material provided in a mold until solidification thereof. Typical polymeric materials used for this purpose are epoxy and polyurethane. At temperatures over about 200° C., the mechanical properties of these polymeric materials decrease to the point that the corresponding parts could easily be broken if subjected to mechanical shocks, such as when cartridges are cleaned by reversed air pulses.

Attempts have been made to avoid the use of polymeric materials in filtration cartridges in order to increase the maximum operating temperature. Ceramic materials have been suggested as an alternative. Unfortunately, it was found that the resistance to mechanical shocks of these ceramic materials was worse than that of their polymeric counterparts.

Metals have much better mechanical properties when compared to polymers or ceramics. However, the main problem is to attach the filtration element to the metal parts. The filtration element is usually a pleated fabric which is typically resistant to a temperature up to about 260° C. This maximum temperature is relatively low compared to the melting point of most metals. For instance, aluminum has a melting point of about 660° C. Immersing a portion of the filtration element directly into molten aluminum would destroy it in a few seconds.

SUMMARY

The present invention reduces the difficulties and disadvantages experienced in the prior art by providing a design allowing to connect metallic end members to the filtration element. Among other things, this results in filtration cartridges having a much higher resistance to mechanical shocks and higher operating temperatures.

Other aspects and advantages of the present invention are described in or apparent from the following detailed description of a preferred embodiment made in conjunction with the accompanying figures.

DETAILED DESCRIPTION

Figure 1:
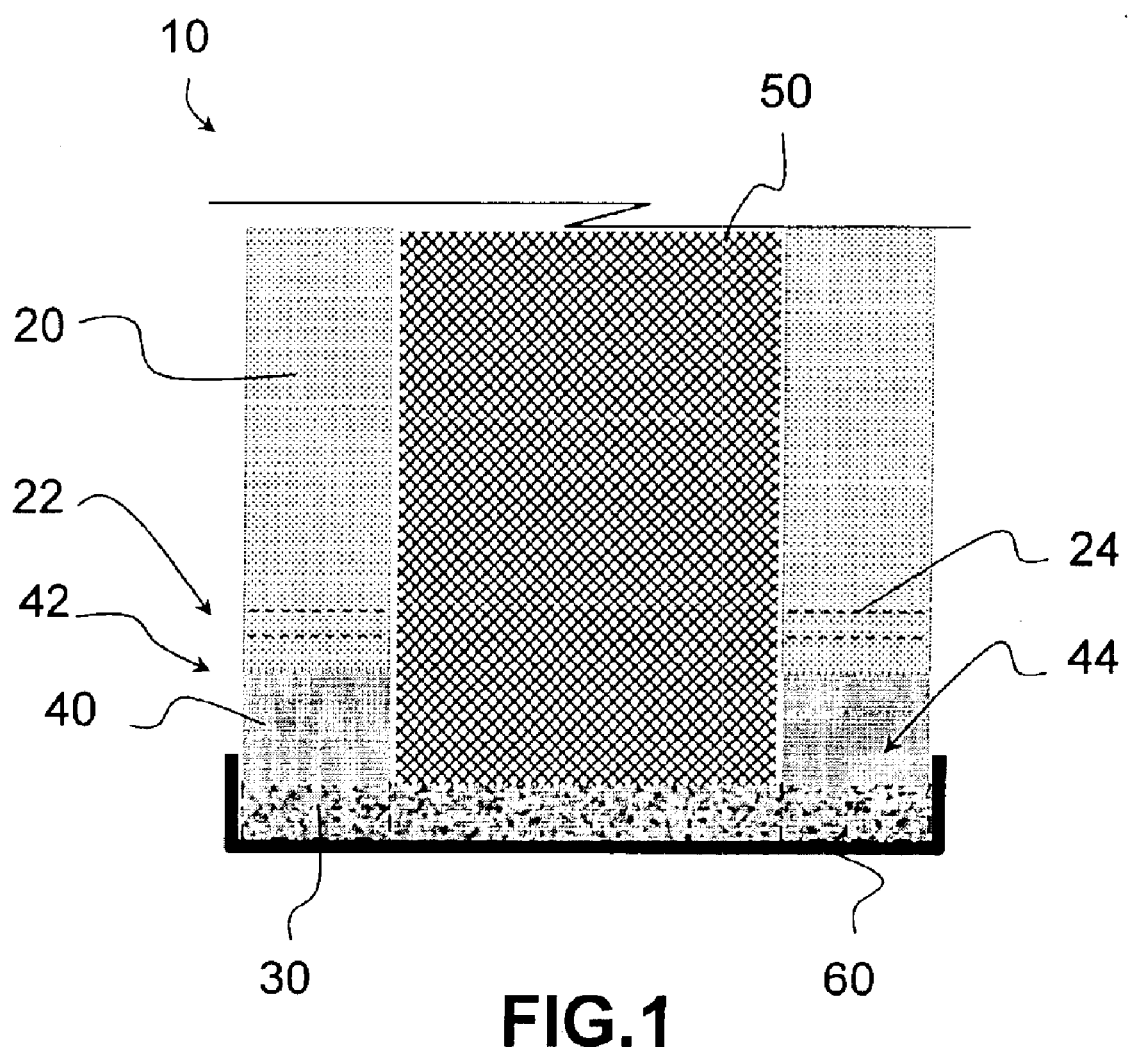
FIG. 1 illustrates a filtration cartridge manufactured with a metallic cast end member in accordance with a first and preferred embodiment of the present invention.
Figure 2:
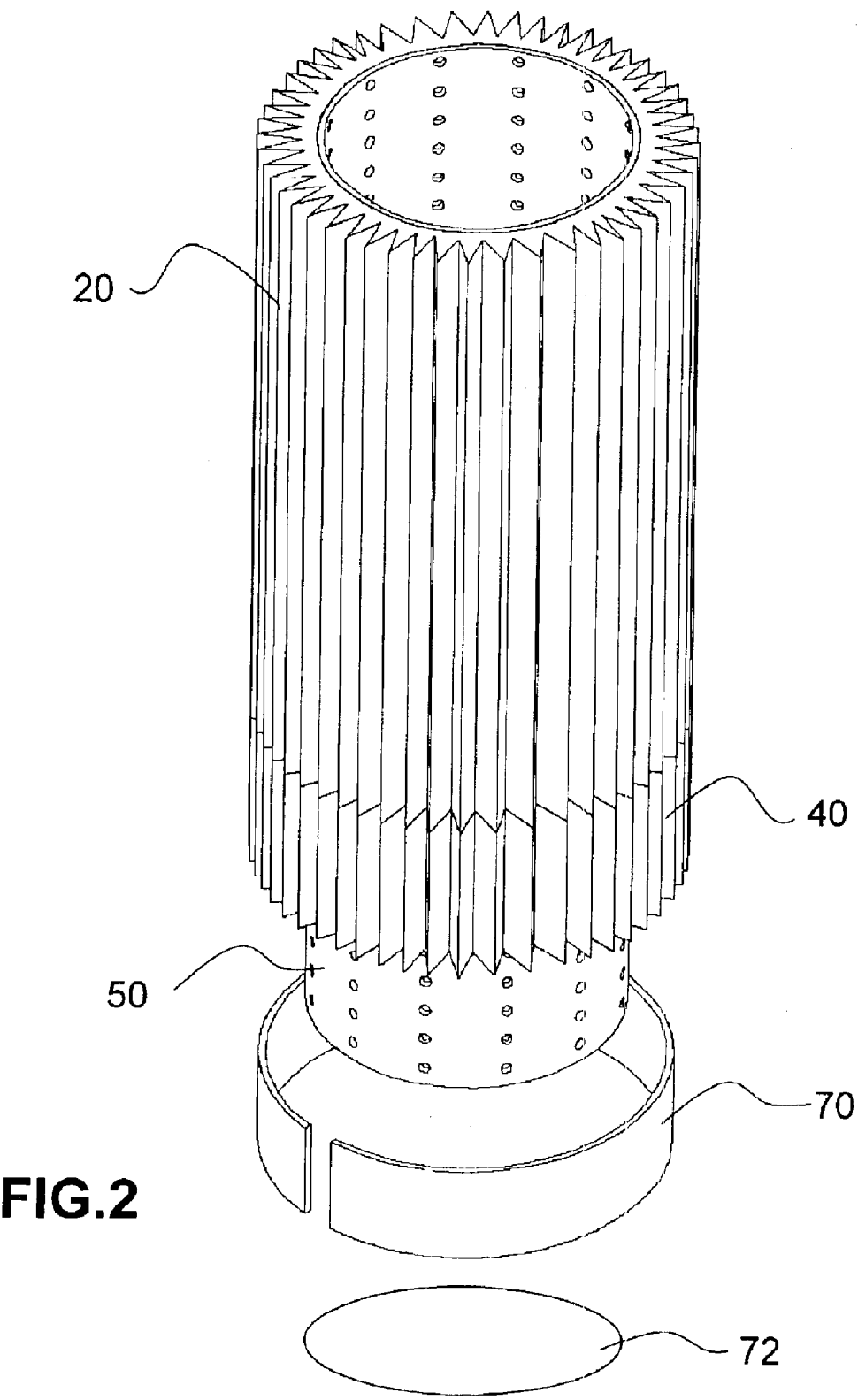
FIG. 2 shows a second embodiment of the present invention.

FIG. 1 shows a filtration cartridge (10) having a metallic end member (30) in accordance with the preferred embodiment of the present invention. FIG. 2 shows an alternative embodiment thereof. It should be noted that the present invention is not limited to the illustrated embodiments and that many other embodiments can be devised as well without departing from the scope of the appended claims.

The filtration cartridge (10) comprises a filtration element (20). The filtration element (20) is usually in the form of a porous fabric or an equivalent thereof. It is generally provided in a pleated form in order to increase the total surface area. It should be noted, however, that the present invention is not limited to pleated filtration elements. The most common form of the filtration element (20) is the one shaped as a hollow cylinder.

The filtration cartridge (10) comprises at least one metallic end member (30), although most of the time, two metallic end members (30) will be used. Four metallic end members (30) would be present if the filtration element (20) is rectangular. In accordance with the present invention, the connection between the filtration element (20) and the metallic end member (30) is made using an extension band (40). This extension band (40) has a first longitudinal edge (42) attached along an edge (22) of the filtration element (20). The extension band (40) is used to increase the length of the filtration element (20) and avoid direct contact of the filtration element (20) with the hot metal during manufacturing.

The extension band (40) is preferably in the form of a thin metallic sheet band made of a material that can be laminated.

Examples of such material are aluminum or an alloy thereof, stainless steel or steel. Other materials can be used as well. In all cases, the material must be heat resistant, which means that it must withstand the highest temperatures encountered during the manufacturing process. The thickness of the extension band (40) is preferably between 20 and 500 μm, with a width between about 5 mm and 150 mm. The width of the extension band must be calculated based in most part on the thermal conductivity of the material being used. Smaller extension bands can be used when thermal conductivity of the material is lower.

When the filtration element (20) has a pleated design, the extension band (40) is preferably connected to it before the pleating is made. This way, the pleating of the filtration element (20) and that of the extension band (40) can be made simultaneously.

The connection between the filtration element (20) and the extension band (40) is made using any suitable connection method. However, it is preferably achieved using sewing, especially if the filtration element (20) is made of a porous fabric. Example of materials for the sewing threads (24) are metal, fiberglass, ceramic or Teflon®. Other materials can also be used as well. One or more rows of sewing threads (24) may be used. Also, the first edge (42) of the extension band (40) preferably overlaps the edge (22) of the filtration element (20) when using sewing.

Filtration cartridges (10) having a pleated filtration element (20) shaped as a hollow cylinder are generally provided with a porous rigid inner core (50), for instance a metallic cylindrical supporting mesh, coaxially disposed therein. An inner core (50) would not be required if the filtration element (20) has sufficient strength by itself. Yet, the inner core (50) is said to be porous, which means that fluids are allowed to flow through it or between its components. The inner core (50) is used to rigidly connect the two end members (30) and to support the filtration element (20). It should be noted that various kinds of inner cores (50) can be used. For instance, the inner core (50) can include a plurality of elongated bars connecting both metallic cast end members (30). In all cases, the material must be heat resistant, which means that it must withstand the highest temperatures encountered during the manufacturing process.

During the manufacturing of the filtration cartridges (10) in the embodiment shown in FIG. 1, a second edge (44) of the extension band (40) is immersed into molten metal provided in a mold in order to create a metallic cast end member (30). The molten metal can be poured into the mold before or after the insertion of the extension band (40). The molten metal is then allowed to solidify with the second edge (44) of the extension band (40) embedded therein. If an inner core (50) or another kind of support is provided, then one of its ends is also immersed into the molten metal before it solidifies.

Since there are usually two end members (30) for each cylindrical filtration cartridge (10), a second metallic cast end member (30) is manufactured after the first one has solidified. The second extension band (40) would preferably be already attached to an opposite side of the filtration element (20) at that point. The whole filtration cartridge (10) is then simply rotated and the second extension band (40) is immersed in another quantity of molten metal.

The molten metal used for manufacturing the metallic cast end members (30) preferably includes aluminum or an alloy thereof. The advantages of using aluminum are numerous. For instance, aluminum has relatively low melting temperature, it is light and it is highly resistant. Nevertheless, other kind of metals can be used as well, including alloys.

If desired, the mold used for shaping a metallic cast end member (30), or a portion thereof, can be designed to remain on the filtration cartridge (10) after the manufacturing process. For instance, the mold can include a cup (60) in which the molten metal is poured. After solidification, the cup (60) would be designed to remain on the outer part of the metallic cast end member (30) and form an integral part thereof. This can be useful to further increase the mechanical properties of the filtration cartridges (10), as well as providing a better surface finish. The cup (60) is preferably made of metal, such as steel or any other metal.

FIG. 2 illustrates another possible embodiment. This embodiment would be used essentially for cylindrical filtration cartridges with porous metallic inner core (50). In this case, the extension band (40) is sewed to the filtration element (20) as in the first embodiment. The extension band (40) is squeezed on a corresponding end of the inner core (50), thereby cause it to be permanently deformed. While this deformation may allow some types of extension bands (40) to be suitably held on the inner core (50), a metallic belt (70) or a similar arrangement is preferably used for added resistance. A metal plate (72) in then welded on the inner core (50) in order to seal the corresponding end. The extension band (40), among other things, protects the filtration element (20) from the heat generated by the welding.

As can be appreciated, the use of metallic end members (30) allows increasing the maximum operating temperature of the filtration cartridge (10) and increasing its resistance to mechanical shocks. This maximum temperature then become dependant upon the material used for the filtration element (20) and consequently, will be further increased as new and suitable materials are found.

What is claimed is:

1. A filtration cartridge comprising:
   a filtration element;
   a heat-resistant extension band having a first and a second longitudinal edge, the first edge being attached along an edge of the filtration element; and
   a metallic cast end member, the second edge of the extension band being embedded within the metallic cast end member, wherein said filtration element is heat resistant up to a maximum temperature that is relatively low compared to a melting point temperature of said metallic cast end member.

2. The filtration cartridge according to claim 1, wherein the extension band is made of a metal sheet.

3. The filtration cartridge according to claim 2, wherein the extension band has a thickness between 20 and 500 microns, and a width between 5 and 150 mm.

4. The filtration cartridge according to claim 1, wherein the filtration element includes a porous fabric.

5. The filtration cartridge according to claim 4, wherein the filtration element is pleated and shaped to form a hollow cylinder.

6. The filtration cartridge according to claim 5, further comprising a rigid, heat-resistant and porous inner core coaxially disposed inside the filtration element, the inner core having one end embedded within the metallic cast end member.

7. The filtration cartridge according to claim 6, wherein the inner core comprises a cylindrical metallic supporting mesh.

8. The filtration cartridge according to claim 4, wherein the first edge of the extension band overlaps the edge of the filtration element and is attached thereto using at least one sewing thread.

9. The filtration cartridge according to claim 8, wherein the sewing thread is a metallic wire.

10. The filtration cartridge according to claim 1, wherein the metallic cast end member comprises aluminum solidified onto the embedded second edge of the extension band.

11. The filtration cartridge according to claim 1, further comprising an outer cup attached over the metallic cast end member, whereby the outer cup served as a molten metal mold during manufacturing.

12. A filtration cartridge comprising:
 a filtration element having two opposite edges, the filtration element including a pleated porous fabric shaped as a hollow cylinder;
 two metallic extension bands, each having a first and a second longitudinal edge, the first edge of each extension band being sewed along a corresponding edge of the filtration element and pleated therewith;
 a rigid metallic cylindrical porous inner core coaxially disposed inside the filtration element, the inner core having two opposite ends, each end being adjacent to the second edge of one corresponding extension band; and
 two metallic cast end members, the second edge of each extension band and each adjacent end of the inner core being embedded within one corresponding metallic cast end member.

13. The filtration cartridge according to claim 12, wherein each extension band has a thickness between 20 and 500 microns, and a width between 5 and 150 mm.

14. The filtration cartridge according to claim 12, wherein the inner core comprises a supporting mesh.

15. The filtration cartridge according to claim 12, wherein the first edge of each extension band overlaps the corresponding edge of the filtration element and is attached thereto using at least one sewing thread.

16. The filtration cartridge according to claim 15, wherein the sewing threads are metallic wires.

17. The filtration cartridge according to claim 12, wherein the metallic cast end members comprises aluminum solidified onto the embedded second edge of the extension bands.

18. The filtration cartridge according to claim 12, further comprising an outer cup attached over each of the metallic cast end members, whereby each of the outer cups served as a molten metal mold during manufacturing.

19. A method for providing a metallic end member at an edge of a filtration element, the method comprising:
 attaching a heat-resistant extension band along the edge of the filtration element, the extension band having a first and a second longitudinal edge;
 immersing the second edge of the extension band into molten metal provided in a mold; and
 allowing the molten metal to solidify with the second edge of the extension embedded therein, wherein said filtration element is heat resistant up to a maximum temperature that is relatively low compared to a melting point temperature of said metallic end member.

20. The method according to claim 19, wherein the extension band is attached to the filtration element by overlapping the first edge of extension band and the edge of the filtration element, and then sewing them together.

21. The method according to claim 20, further comprising:
 pleating the filtration element and the extension band before immersing the second edge of the extension band into the molten metal.

22. The method according to claim 21, further comprising:
 shaping the pleated filtration element and extension band as a hollow cylinder;
 inserting a rigid, heat-resistant and porous inner core inside the cylinder, the inner core having two opposite ends; and
 immersing one of the ends of the inner core into the molten metal before it solidifies.

23. The method according to claim 19, wherein the molten metal is cast in an individual mold, at least a portion of the mold being left on the solidified metal.

24. The method according to claim 19, further comprising:
 providing a second extension band on a second edge of the filtration element, the second edge of the filtration element being opposite its other edge, the second extension band having a first and a second longitudinal edge, the first edge of the second extension band being attached to the second edge of the filtration element.

25. The method according to claim 24, wherein after solidification of the molten metal, the method further comprises:
 pivoting the filtration element, the extension bands and the metallic cast end member; and
 providing a second metallic cast end member, connected to the second edge of the second extension band, by immersing the second edge of the second extension band into molten metal and allowing the molten metal to solidify so as to embedded it therein.

* * * * *